US012570124B2

(12) United States Patent
Williams et al.

(10) Patent No.: US 12,570,124 B2
(45) Date of Patent: Mar. 10, 2026

(54) EMERGENCY HEATING SYSTEM FOR ELECTRIC VEHICLE (EV) RUNNING OUT OF POWER

(71) Applicant: STATE FARM MUTUAL AUTOMOBILE INSURANCE COMPANY, Bloomington, IL (US)

(72) Inventors: Aaron Williams, Congerville, IL (US); Joseph Robert Brannan, Bloomington, IL (US); John R. Donovan, Bloomington, IL (US); Brian N. Harvey, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 18/749,188

(22) Filed: Jun. 20, 2024

(65) Prior Publication Data

US 2024/0336111 A1 Oct. 10, 2024

Related U.S. Application Data

(63) Continuation of application No. 17/850,035, filed on Jun. 27, 2022, now Pat. No. 12,043,085.

(60) Provisional application No. 63/350,177, filed on Jun. 8, 2022.

(51) Int. Cl.
| | |
|---|---|
| *B60H 1/00* | (2006.01) |
| *B60L 1/02* | (2006.01) |
| *B60W 60/00* | (2020.01) |

(52) U.S. Cl.
CPC ............ *B60H 1/00735* (2013.01); *B60L 1/02* (2013.01); *B60W 60/0016* (2020.02); *B60W 2510/244* (2013.01); *B60W 2555/20* (2020.02)

(58) Field of Classification Search
CPC .. B60H 1/00735; B60L 1/02; B60W 60/0016; B60W 2510/244; B60W 2555/20
See application file for complete search history.

(56) References Cited

U.S. PATENT DOCUMENTS

| | | | |
|---|---|---|---|
| 6,721,637 | B2 | 4/2004 | Abe et al. |
| 6,814,170 | B2 | 11/2004 | Abe et al. |
| 8,981,716 | B2 | 3/2015 | Bianco |
| 9,290,103 | B2 | 3/2016 | Bianco |
| 9,311,271 | B2 | 4/2016 | Wright |
| 9,633,487 | B2 | 4/2017 | Wright |

(Continued)

FOREIGN PATENT DOCUMENTS

| | | | | | |
|---|---|---|---|---|---|
| CA | 2335155 | C | * | 9/2009 | ............ B60T 8/4863 |
| EP | 1077149 | A2 | * | 2/2001 | .............. B60L 58/20 |

(Continued)

*Primary Examiner* — Hung Q Nguyen
(74) *Attorney, Agent, or Firm* — MARSHALL, GERSTEIN & BORUN LLP

(57) ABSTRACT

Methods and systems for providing emergency heating in an electric vehicle (EV) running out of power are described herein. An on-board computer or mobile device in an EV may determine that an amount of charge remaining for powering the EV is below a threshold charge level. The on-board computer or mobile device may then route the remaining amount of charge to power a heating system in the EV to maintain a temperature in the EV above a threshold temperature level, and shut down power to other components within the EV.

20 Claims, 6 Drawing Sheets

(56) References Cited

U.S. PATENT DOCUMENTS

| | | | |
|---|---|---|---|
| 9,830,748 | B2 | 11/2017 | Rosenbaum |
| 9,990,782 | B2 | 6/2018 | Rosenbaum |
| 10,192,369 | B2 | 1/2019 | Wright |
| 10,198,879 | B2 | 2/2019 | Wright |
| 10,269,190 | B2 | 4/2019 | Rosenbaum |
| 10,467,824 | B2 | 11/2019 | Rosenbaum |
| 11,227,452 | B2 | 1/2022 | Rosenbaum |
| 11,407,410 | B2 | 8/2022 | Rosenbaum |
| 11,524,707 | B2 | 12/2022 | Rosenbaum |
| 11,594,083 | B1 | 2/2023 | Rosenbaum |
| 2011/0307134 | A1 | 12/2011 | Yoshimi |
| 2013/0332016 | A1* | 12/2013 | Suzuki ................. F02D 41/021 |
| | | | 701/22 |
| 2015/0252971 | A1 | 9/2015 | Demuynck et al. |
| 2016/0185246 | A1 | 6/2016 | Paul |
| 2017/0361717 | A1 | 12/2017 | Qin et al. |
| 2018/0272880 | A1 | 9/2018 | Bianco et al. |
| 2020/0298727 | A1* | 9/2020 | Ukai .................. G01R 31/3647 |
| 2020/0376927 | A1* | 12/2020 | Rajaie ............... B60H 1/00764 |
| 2021/0122258 | A1 | 4/2021 | Sham |
| 2022/0092893 | A1 | 3/2022 | Rosenbaum |
| 2022/0340148 | A1 | 10/2022 | Rosenbaum |
| 2023/0060300 | A1 | 3/2023 | Rosenbaum |

FOREIGN PATENT DOCUMENTS

| | | | | |
|---|---|---|---|---|
| EP | 3239686 | A1 | 11/2017 | |
| EP | 3578433 | B1 | 8/2020 | |
| EP | 3730375 | B1 | 10/2021 | |
| EP | 3960576 | A1 | 3/2022 | |
| EP | 4190659 | A1 | 6/2023 | |
| EP | 4190660 | A1 | 6/2023 | |
| JP | 2001050074 | A * | 2/2001 | .......... B60L 15/2072 |

* cited by examiner

_500_

DETERMINE THAT AN AMOUNT OF
CHARGE REMAINING FOR POWERING
AN EV IS BELOW A THRESHOLD
CHARGE LEVEL _502_

ROUTE THE REMAINING AMOUNT OF
CHARGE TO HEATING SYSTEM IN
THE EV TO MAINTAIN A TEMPERATURE
ABOVE A THRESHOLD
TEMPERATURE LEVEL _504_

SHUT DOWN POWER TO OTHER
COMPONENTS IN EV _506_

EMERGENCY HEATING SYSTEM FOR ELECTRIC VEHICLE (EV) RUNNING OUT OF POWER

CROSS-REFERENCE TO RELATED APPLICATIONS

This application is a continuation of U.S. patent application Ser. No. 17/850,035 entitled "Emergency Heating System for Electric Vehicle (EV) Running out of Power," filed on Jun. 27, 2022, which claims priority to and the benefit of the filing date of provisional U.S. Patent Application No. 63/350,177 entitled "Emergency Heating System for Electric Vehicle (EV) Running out of Power," filed on Jun. 8, 2022. The entire contents of each of which are hereby expressly incorporated herein by reference.

FIELD

The present disclosure generally relates to systems and methods for providing emergency heating to an electric vehicle (EV).

BACKGROUND

Vehicles are typically powered using electricity, gasoline, and/or a hybrid of the two. When a vehicle is running low on power and does not have enough range to reach the nearest fueling and/or charging station, the vehicle may need emergency services, such as a tow truck to assist the vehicle in reaching the nearest fueling and/or charging station. However, emergency service providers may have limited resources and may be unable to travel to the vehicle's location for a long time.

This may be dangerous for drivers and/or passengers waiting for emergency services to arrive, particularly when there are extreme weather conditions outside of the vehicle, such as heavy rain, snow, or very low temperatures.

BRIEF SUMMARY

The present embodiments may be related to, inter alia, electric vehicles and/or autonomous or semi-autonomous vehicle operation, including driverless operation of fully autonomous vehicles. The embodiments described herein relate particularly to various aspects of communication between autonomous operation features, components, and software. Specific systems and methods are summarized below. The methods and systems summarized below may include additional, less, or alternate actions, including those discussed elsewhere herein.

In one aspect, a computer-implemented method for providing emergency heating in an electric vehicle (EV) running out of power may be provided. The method may include (1) determining, by one or more processors in an EV, that an amount of charge remaining for powering the EV is below a threshold charge level; (2) routing, by the one or more processors, the remaining amount of charge to power a heating system in the EV to maintain a temperature in the EV above a threshold temperature level; and/or (3) shutting down, by the one or more processors, power to other components within the EV. The method may include additional, less, or alternate actions and functionality, including that discussed elsewhere herein.

For instance, the threshold temperature level may be based upon a temperature outside of the EV, and/or the threshold temperature level may be inversely proportional to the outside temperature.

In some embodiments, the threshold temperature level may be a first threshold temperature level, and the method may further include determining, by the one or more processors, a temperature outside of the EV; and/or routing, by the one or more processors, the remaining amount of charge to power the heating system in response to determining that the outside temperature is below a second threshold temperature level.

Also in some embodiments, the EV may have one or more autonomous operation features. The method may further include in response to determining that the amount of charge remaining for powering the EV is below the threshold charge level, sending, by the one or more processors, control signals to the EV to cause the EV to pull over to a side of a road.

In further embodiments, the method may further include (i) determining, by the one or more processors, a duration until emergency services are expected to arrive; (ii) predicting, by the one or more processors, a maximum temperature that the heating system can maintain in the EV using the remaining amount of charge for the determined duration; and/or (iii) in response to determining that the maximum temperature is within a threshold range of the threshold temperature level, setting, by the one or more processors, the temperature in the vehicle to the maximum temperature. The method may also include in response to determining that the maximum temperature is not within the threshold range of the threshold temperature level: (iv) determining, by the one or more processors, a maximum duration that in which the heating system can maintain the threshold temperature level using the remaining amount of charge; and/or (v) transmitting, by the one or more processors, a notification to the emergency services indicating the maximum duration.

Systems or computer-readable media storing instructions for implementing all or part of the system described above may also be provided in some aspects. Systems for implementing such methods may include one or more of the following: a special-purpose assessment computing device, a mobile computing device (mobile device), a personal electronic device, an on-board computer, a remote server, one or more sensors, one or more communication modules configured to communicate wirelessly via radio links, radio frequency links, and/or wireless communication channels, and/or one or more program memories coupled to one or more processors of the mobile computing device, personal electronic device, on-board computer, or remote server. Such program memories may store instructions to cause the one or more processors to implement part or all of the method described above. Additional or alternative features described herein below may be included in some aspects.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

The systems and methods disclosed herein generally related to various aspects of electric vehicles and utilizing fuel and/or battery power within an electric vehicle to power components within the electric vehicle, such as the motor, engine, steering control, brakes, vehicle sensors, lighting, heating system, cooling system, in-vehicle infotainment system, windshield wipers, etc. The electric vehicles described herein may include fully electric vehicles powered solely by a battery or hybrid vehicles powered by a combination of a battery and fuel, such as gasoline.

The systems and methods disclosed herein also generally relate to various aspects of communication between autonomous operation features, components, and software. The autonomous operation features may take full control of the vehicle under certain conditions, viz. fully autonomous operation, or the autonomous operation features may assist the vehicle operator in operating the vehicle, viz. partially autonomous operation. Fully autonomous operation features may include systems within the vehicle that pilot the vehicle to a destination with or without a vehicle operator present (e.g., an operating system for a driverless car). Partially autonomous operation features may assist the vehicle operator in limited ways (e.g., automatic braking or collision avoidance systems). Fully or partially autonomous operation features may perform specific functions to control or assist in controlling some aspect of vehicle operation, or such features may manage or control other autonomous operation features. For example, a vehicle operating system may control numerous subsystems that each fully or partially control aspects of vehicle operation. The electric vehicles described herein may be fully autonomous, partially autonomous, manually operated, or any suitable combination of these.

Autonomous operation features utilize data not available to a human operator, respond to conditions in the vehicle operating environment faster than human operators, and do not suffer fatigue or distraction. Thus, the autonomous operation features may also significantly affect various risks associated with operating a vehicle.

Exemplary Electric Vehicle Operation System

Figure 1A:
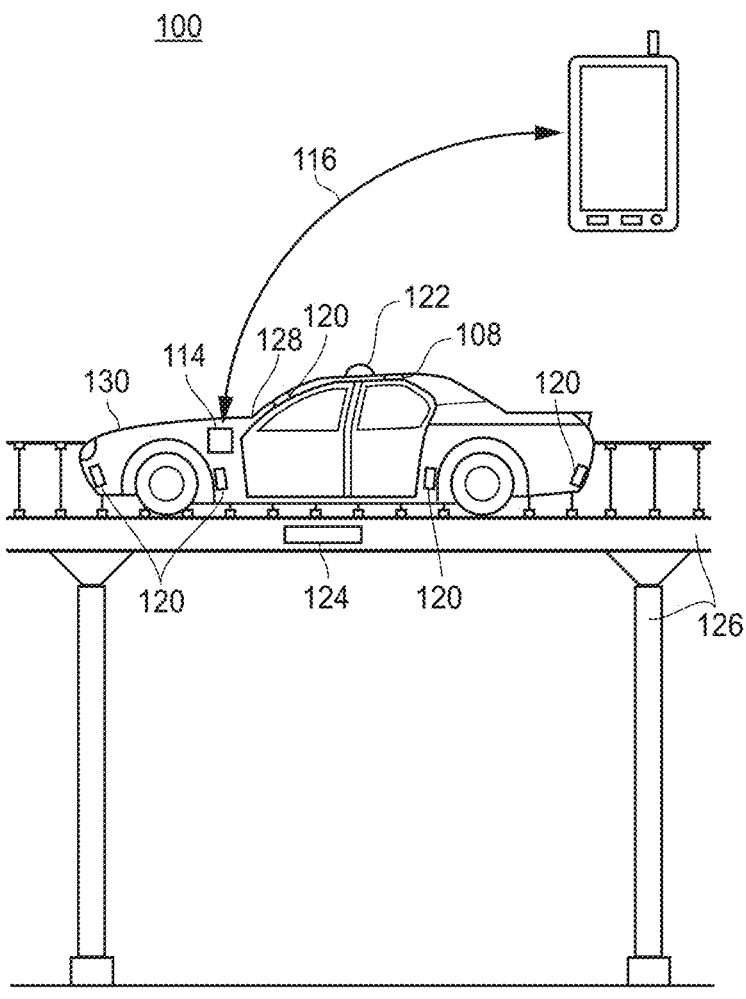
FIG. 1A illustrates a block diagram of an exemplary EV data system for EV operation, monitoring, communication, and/or related functions.

FIG. 1A illustrates a block diagram of an exemplary EV data system 100 on which the exemplary methods described herein may be implemented. The high-level architecture includes both hardware and software applications, as well as various data communications channels for communicating data between the various hardware and software components. The EV data system 100 may obtain information regarding an EV 108 (e.g., an electric car, truck, motorcycle, etc.) and the surrounding environment. An on-board computer 114 may utilize this information to operate the EV 108 according to an autonomous operation feature or to assist the vehicle operator in operating the EV 108. To monitor the EV 108, the EV may include one or more sensors 120 installed within the EV 108 and/or personal electronic devices that may communicate with the on-board computer 114. The sensor data may be processed using the on-board computer 114 or a mobile device 110 (e.g., a smart phone, a tablet computer, a special purpose computing device, smart watch, wearable electronics, smart glasses, augmented reality (AR) glasses, virtual reality (VR) headset, etc.) to determine when the EV 108 is in operation and information regarding the vehicle.

One or more on-board computers 114 may be permanently or removably installed in the EV 108. The on-board computer 114 may interface with the one or more sensors 120 within the vehicle 108 (e.g., a digital camera, a LIDAR sensor, an ultrasonic sensor, an infrared sensor, an ignition sensor, an odometer, a system clock, a speedometer, a tachometer, an accelerometer, a gyroscope, a compass, a geolocation unit, radar unit, etc.), which sensors may also be incorporated within or connected to the on-board computer 114.

The EV 108 may be powered by a battery 130 which supplies power to the electrical components within the EV 108, such as the motor, engine, steering control, brakes, vehicle sensors, lighting, heating system 128, cooling system, in-vehicle infotainment system, windshield wipers, etc. The battery 130 may include a charge level sensor to detect the amount of charge remaining in the battery 130. The heating system 128 may provide heat to the interior of the EV 108 for example, via a heat pump to heat the interior of the EV 108 to a desired temperature.

In some implementations, the heating system 128 adjusts the amount of heat provided to the interior of the EV 108 based upon the desired temperature and the in-cabin temperature from a temperature sensor. For example, the heating system 128 may include a controller to adjust the speed of the heat pump according to the difference between the desired temperature and the in-cabin temperature using Proportional, Integral, and Derivative (PID) control.

The battery 130 may be electrically coupled to the components within the EV 108, for example via wired connection. Additionally, the EV 108 may include switches for turning the power to each of the electrical components on and off, so that the battery 130 can supply power to some electrical components within the EV 108 without supplying power to other electrical components. This is described in more detail with reference to FIGS. 4A and 4B.

The EV 108 may further include a communication component 122 to transmit information to and receive information from external sources, including other vehicles, infrastructure, emergency services, etc. In some embodiments, the mobile device 110 may supplement the functions performed by the on-board computer 114 described herein by, for example, sending or receiving information to and from an emergency services provider via a network, such as over one or more radio frequency links or wireless communication channels. In other embodiments, the on-board computer 114 may perform all of the functions of the mobile device 110 described herein, in which case no mobile device 110 may be present in the system 100. Additionally, the mobile device 110 and on-board computer 114 may communicate with one another directly over link 116.

The mobile device 110 may be either a general-use personal computer, cellular phone, smart phone, tablet computer, smart watch, wearable electronics, or a dedicated vehicle monitoring or control device. Although only one mobile device 110 is illustrated, it should be understood that a plurality of mobile devices 110 may be used in some embodiments. The on-board computer 114 may be a general-use on-board computer capable of performing many functions relating to vehicle operation or a dedicated computer for autonomous vehicle operation. Further, the on-board computer 114 may be installed by the manufacturer of the EV 108 or as an aftermarket modification or addition to the EV 108. In some embodiments or under certain conditions, the mobile device 110 or on-board computer 114 may function as thin-client devices that outsource some or most of the processing to a server.

The sensors 120 may be removably or fixedly installed within the EV 108 and may be disposed in various arrangements to provide information to the EV 108 for operation. Among the sensors 120 may be included one or more of a GPS unit, a radar unit, a LIDAR unit, an ultrasonic sensor, an infrared sensor, an inductance sensor, a camera, an accelerometer, a tachometer, a speedometer, an outdoor temperature sensor for sensing the temperature outside of the EV, and/or an in-cabin temperature sensor for sensing the temperature within the EV 108.

Some of the sensors 120 (e.g., radar, LIDAR, or camera units) may actively or passively scan the vehicle environment for obstacles (e.g., other vehicles, buildings, pedestrians, etc.), roadways, lane markings, signs, or signals. Other sensors 120 (e.g., GPS, accelerometer, or tachometer units) may provide data for determining the location or movement of the EV 108. Still other sensors 120 may be directed to the interior or passenger compartment of the EV 108, such as cameras, microphones, pressure sensors, thermometers, or similar sensors to monitor the vehicle operator and/or passengers within the EV 108. Information generated or received by the sensors 120 may be communicated to the on-board computer 114 or the mobile device 110 for use in vehicle operation.

In further embodiments, an infrastructure communication device 124 may be included for monitoring the status of one or more infrastructure components 126. Infrastructure components 126 may include roadways, bridges, traffic signals, gates, switches, crossings, parking lots or garages, toll booths, docks, hangars, or other similar physical portions of a transportation system's infrastructure. The infrastructure communication device 124 may include or be communicatively connected to one or more sensors (not shown) for detecting information relating to the condition of the infrastructure component 126. The sensors (not shown) may generate data relating to weather conditions, traffic conditions, or operating status of the infrastructure component 126.

The infrastructure communication device 124 may be configured to receive the sensor data generated and determine a condition of the infrastructure component 126, such as weather conditions, road integrity, construction, traffic, available parking spaces, etc. The infrastructure communication device 124 may further be configured to communicate information to vehicles, such as the EV 108 via the communication component 122. In some embodiments, the infrastructure communication device 124 may receive information from one or more vehicles, while, in other embodiments, the infrastructure communication device 124 may only transmit information to the vehicles. The infrastructure communication device 124 may be configured to monitor vehicles and/or communicate information to other vehicles and/or to mobile devices 110.

In some embodiments, the communication component 122 may receive information from external sources, such as other vehicles or infrastructure. The communication component 122 may also send information regarding the EV 108 to external sources. To send and receive information, the communication component 122 may include a transmitter and a receiver designed to operate according to predetermined specifications, such as the dedicated short-range communication (DSRC) channel, wireless telephony, Wi-Fi, or other existing or later-developed communications protocols. The received information may supplement the data received from the sensors 120 to implement the autonomous operation features. For example, the communication component 122 may receive information that an autonomous vehicle ahead of the EV 108 is reducing speed, allowing the adjustments in the autonomous operation of the vehicle EV.

In addition to receiving information from the sensors 120, the on-board computer 114 may directly or indirectly control the operation of the EV 108 according to various autonomous operation features. The autonomous operation features may include software applications or modules implemented by the on-board computer 114 to generate and implement control commands to control the steering, braking, or throttle of the EV 108. To facilitate such control, the on-board computer 114 may be communicatively connected to control components of the EV 108 by various electrical or electromechanical control components (not shown). When a control command is generated by the on-board computer 114, it may thus be communicated to the control components of the EV 108 to effect a control action. In embodiments involving fully autonomous vehicles, the EV 108 may be operable only through such control components (not shown). In other embodiments, the control components may be disposed within or supplement other vehicle operator control components (not shown), such as steering wheels, accelerator or brake pedals, or ignition switches.

Although the EV data system 100 is shown to include one EV 108, one mobile device 110, and one on-board computer 114, it should be understood that different numbers of EVs 108, mobile devices 110, and/or on-board computers 114 may be utilized. For example, the system 100 may include hundreds or thousands of mobile devices 110 or on-board computers 114, all of which may be interconnected via the network.

Figure 1B:
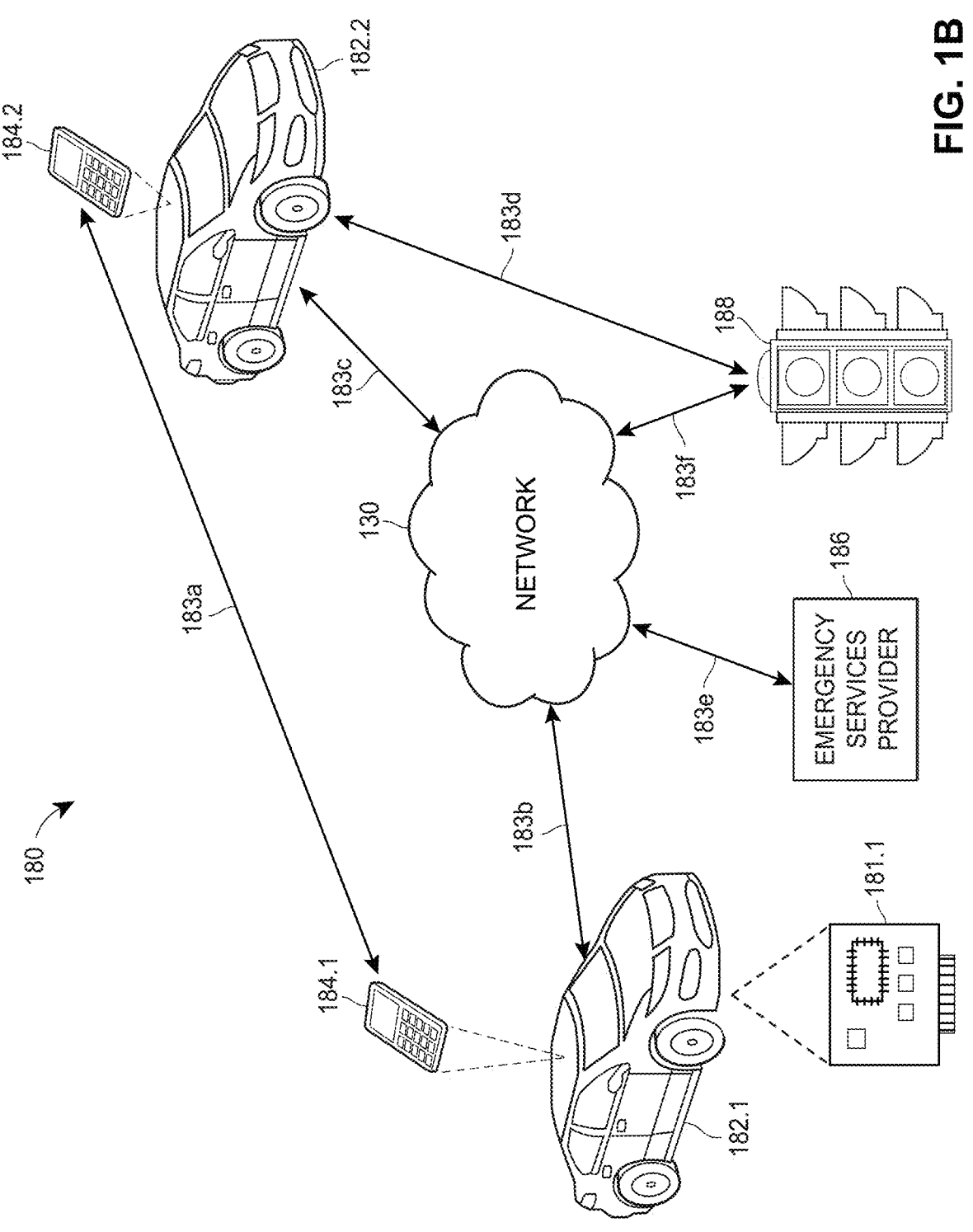
FIG. 1B illustrates a block diagram of an exemplary EV communication system, showing an EV and an emergency services provider.

FIG. 1B illustrates a block diagram of an exemplary EV communication system 180 on which the exemplary methods described herein may be implemented. In one aspect, system 180 may include a network 130, N number of vehicles 182.1-182.N and respective mobile computing devices 184.1-184.N, one or several personal electronic devices (not shown), an emergency service provider 186, and/or a smart infrastructure component 188. In one aspect, mobile computing devices 184 may be an implementation of mobile computing device 110, while vehicles 182 may be an implementation of EV 108. The vehicles 182 may include a plurality of vehicles 108 having autonomous operation features, as well as a plurality of other vehicles not having autonomous operation features.

As illustrated, the vehicle 182.1 may include a vehicle controller 181.1, which may be an on-board computer 114 as discussed elsewhere herein, while vehicle 182.2 may lack such a component. Each of vehicles 182.1 and 182.2 may be configured for wireless inter-vehicle communication, such as vehicle-to-vehicle (V2V) wireless communication and/or data transmission via the communication component 122, directly via the mobile computing devices 184, or otherwise.

The personal electronic devices may include any type of electronic device that monitors conditions associated with an individual. For example, the personal electronic device may be a smart watch, a fitness tracker, a personal medical device (e.g., a pace maker, an insulin pump, etc.) and/or monitoring devices thereof, smart implants, and so on. The personal electronic device may monitor the conditions of the individual while the individual is present in one of the vehicles 182 and/or operating one of the vehicles 182 in a semi-autonomous mode.

Although system 180 is shown in FIG. 1B as including one network 130, two mobile computing devices 184.1 and 184.2, two vehicles 182.1 and 182.2, one emergency services provider 186, and/or one smart infrastructure component 188, various embodiments of system 180 may include any suitable number of networks 130, mobile computing devices 184, vehicles 182, emergency services provider 186, and/or infrastructure components 188. The vehicles 182 included in such embodiments may include any number of vehicles 182.i having vehicle controllers 181.i (such as vehicle 182.1 with vehicle controller 181.1) and vehicles 182.j not having vehicles controllers (such as vehicle 182.2). Moreover, system 180 may include a plurality of emergency service providers 186 and more than two mobile computing devices 184, any suitable number of which being interconnected directly to one another and/or via network 130.

In one aspect, each of mobile computing devices 184.1 and 184.2 may be configured to communicate with one another directly via peer-to-peer (P2P) wireless communication and/or data transfer. In other aspects, each of mobile computing devices 184.1 and 184.2 may be configured to communicate indirectly with one another and/or any suitable device via communications over network 130, such as external computing device 186 and/or smart infrastructure component 188, for example. In still other aspects, each of mobile computing devices 184.1 and 184.2 may be configured to communicate directly and/or indirectly with other suitable devices, which may include synchronous or asynchronous communication.

Each of mobile computing devices 184.1 and 184.2 and/or personal electronic devices may be configured to send data to and/or receive data from one another and/or via network 130 using one or more suitable communication protocols, which may be the same communication protocols or different communication protocols. For example, mobile computing devices 184.1 and 184.2 may be configured to communicate with one another via a direct radio link 183a, which may utilize, for example, a Wi-Fi direct protocol, an ad-hoc cellular communication protocol, etc.

Mobile computing devices 184.1 and 184.2 and/or personal electronic devices may also be configured to communicate with vehicles 182.1 and 182.2, respectively, utilizing a BLUETOOTH communication protocol (radio link not shown). In some embodiments, this may include communication between a mobile computing device 184.1 and a vehicle controller 181.1. In other embodiments, it may involve communication between a mobile computing device 184.2 and a vehicle telephony, entertainment, navigation, or information system (not shown) of the vehicle 182.2 that provides functionality other than autonomous (or semi-autonomous) vehicle control. Thus, vehicles 182.2 without autonomous operation features may nonetheless be connected to mobile computing devices 184.2 in order to facilitate communication, information presentation, or similar non-control operations (e.g., navigation display, hands-free telephony, or music selection and presentation).

To provide additional examples, mobile computing devices 184.1 and 184.2 and/or personal electronic devices may be configured to communicate with one another via radio links 183b and 183c by each communicating with network 130 utilizing a cellular communication protocol. As an additional example, mobile computing devices 184.1 and/or 184.2 may be configured to communicate with the emergency services provider 186 via radio links 183b, 183c, and/or 183e. Still further, one or more of mobile computing devices 184.1 and/or 184.2 and/or personal electronic devices may also be configured to communicate with one or more smart infrastructure components 188 directly (e.g., via radio link 183d) and/or indirectly (e.g., via radio links 183c and 183f via network 130) using any suitable communication protocols. Similarly, one or more vehicle controllers 181.1 may be configured to communicate directly to the network 130 (via radio link 183b) or indirectly through mobile computing device 184.1 (via radio link 183b). Vehicle controllers 181.1 may also communicate with other vehicle controllers and/or mobile computing devices 184.2 directly or indirectly through mobile computing device 184.1 via local radio links 183a.

As discussed elsewhere herein, network 130 may be implemented as a wireless telephony network (e.g., GSM, CDMA, LTE, etc.), a Wi-Fi network (e.g., via one or more IEEE 802.11 Standards), a WiMAX network, a Bluetooth network, etc. Thus, links 183a-183f may represent wired links, wireless links, or any suitable combination thereof. For example, the links 183e and/or 183f may include wired links to the network 130, in addition to, or instead of, wireless radio connections.

The emergency services provider 186 may be a provider of a tow truck, a vehicle or other device for providing temporary charge to the EV 108 so that the EV 108 has enough charge to reach the nearest charging station, or any other suitable vehicle or device for assisting the EV 108 when the EV 108 is unable to travel to the nearest charging and/or fueling station.

In some embodiments, when the amount of charge remaining in the EV 108 is less than a threshold amount of charge, the distance to the nearest charging and/or fueling station is greater than a threshold distance, or any suitable combination of these, the EV 108 automatically transmits a notification to the emergency service provider 186 requesting emergency services, such as towing services or a temporary charge, and/or indicating the location of the EV 108.

In other embodiments, the on-board computer 114 continuously or periodically determines a shutdown risk for the EV 108 based on the amount of charge remaining in the EV 108 and/or the distance to the nearest charging and/or fueling station. For example, when both the amount of charge remaining is low and the distance to the nearest charging and/or fueling station is high, the on-board computer 114 may determine a high level of shutdown risk. On the other hand, when the amount of charge remaining is low, but the distance to the nearest charging and/or fueling station is also low, the on-board computer 114 may determine a medium or low level of shutdown risk. The shutdown risk may be a score for example, on a scale of 1-100 based upon the percentage of charge remaining in the battery and the distance to the nearest charging and/or fueling station.

In other implementations, the on-board computer 114 or mobile device 184.1 may include user controls for a user, such as a driver or passenger to transmit the notification to the emergency service provider 186 requesting emergency services when the user determines that the amount of charge remaining in the EV 108 is too low to reach the nearest charging and/or fueling station.

The emergency services provider 186 may respond to the notification with a response message to the EV 108 indicating that emergency services have been dispatched to the location of the EV 108 and/or indicating an expected time for the emergency service to arrive at the location.

Additionally, the mobile computing devices 184.1 and 184.2 may be configured to execute one or more algorithms, programs, applications, etc., to (i) determine a geographic location of each respective mobile computing device (and thus their associated vehicle); (ii) to generate, measure, monitor, and/or collect one or more sensor metrics as telematics data; (iii) to broadcast the geographic data and/or telematics data via their respective radio links; (iv) to receive the geographic data and/or telematics data via their respective radio links; (v) to determine whether an alert should be generated based upon the telematics data and/or the geographic location data, to generate the one or more alerts; and/or (vi) to broadcast one or more alert notifications. Such functionality may, in some embodiments be controlled in whole or part by a Data Application operating on the mobile computing devices 184, as discussed elsewhere herein. Such Data Application may communicate between the mobile computing devices 184 and one or more external computing devices 186 (such as servers 140) to facilitate centralized data collection and/or processing.

In some embodiments, the Data Application may facilitate control of a vehicle 182 by a user, such as by selecting vehicle destinations and/or routes along which the vehicle 182 will travel. The Data Application may further be used to establish restrictions on vehicle use or store user preferences for vehicle use, such as in a user profile. In further embodiments, the Data Application may monitor vehicle operation or sensor data in real-time to make recommendations or for other purposes as described herein. The Data Application may further facilitate monitoring and/or assessment of the vehicle 182, such as by evaluating operating data to determine the condition of the vehicle or components thereof (e.g., sensors, autonomous operation features, etc.).

In some embodiments, the smart infrastructure component 188 may include or be communicatively connected to one or more sensors (not shown) for detecting information relating to the condition of the smart infrastructure component 188, which sensors may be connected to or part of the infrastructure communication device 124 of the smart infrastructure component 188. The sensors (not shown) may generate data relating to weather conditions, traffic conditions, or operating status of the smart infrastructure component 188. The smart infrastructure component 188 may be configured to receive the sensor data generated and determine a condition of the smart infrastructure component 188, such as weather conditions, road integrity, construction, traffic, available parking spaces, etc.

In some aspects, smart infrastructure component 188 may be configured to communicate with one or more other devices directly and/or indirectly. For example, smart infrastructure component 188 may be configured to communicate directly with mobile computing device 184.2 via radio link 183*d* and/or with mobile computing device 184.1 via links 183*b* and 183*f* utilizing network 130. To provide some illustrative examples of the operation of the smart infrastructure component 188, if smart infrastructure component 188 is implemented as a smart traffic light, smart infrastructure component 188 may change a traffic light from green to red (or vice-versa) or adjust a timing cycle to favor traffic in one direction over another based upon data received from the vehicles 182. If smart infrastructure component 188 is implemented as a traffic sign display, smart infrastructure component 188 may display a warning message that an anomalous condition (e.g., an accident) has been detected ahead and/or on a specific road corresponding to the geographic location data.

Figure 2:
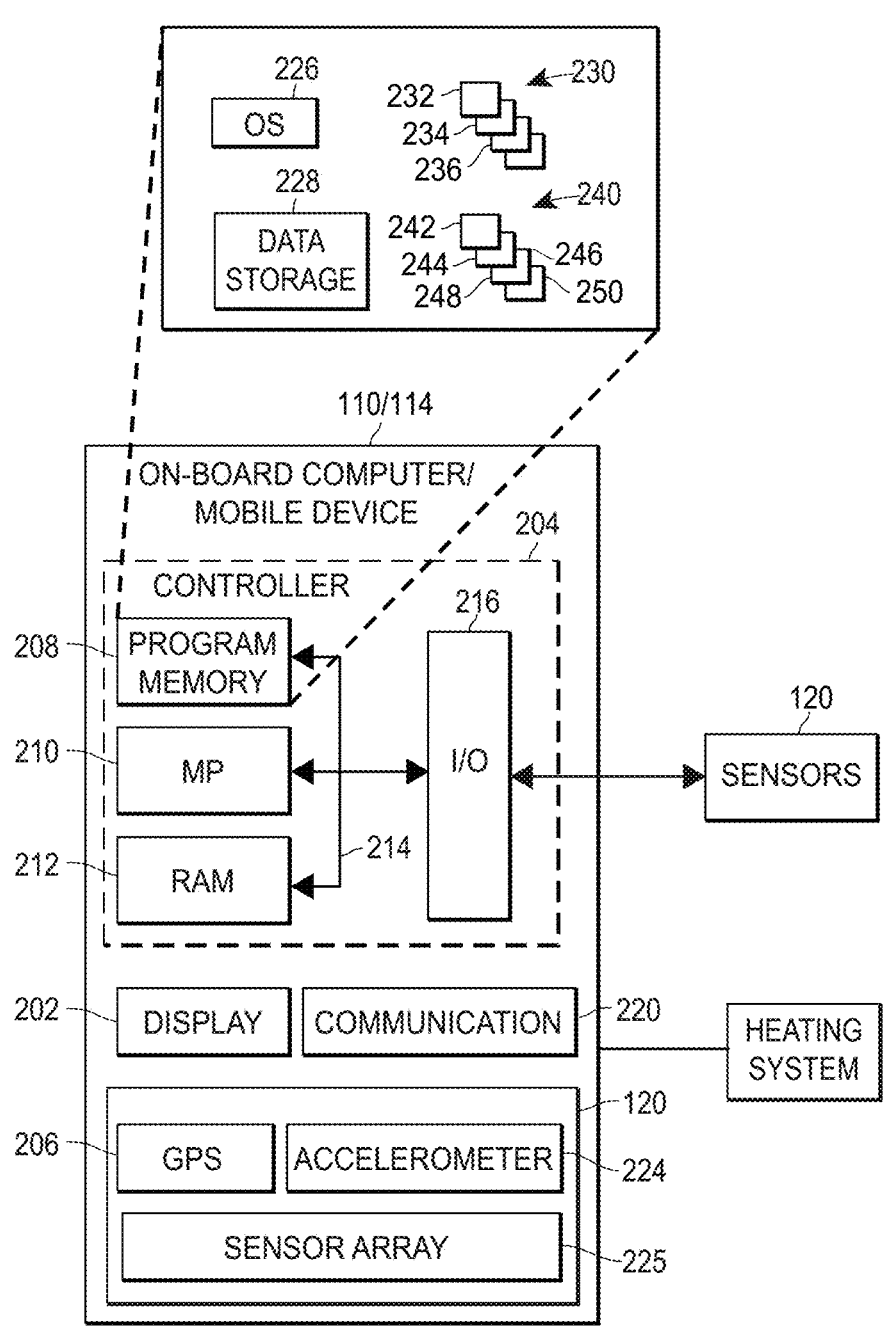
FIG. 2 illustrates a block diagram of an exemplary on-board computer or mobile device.

FIG. 2 illustrates a block diagram of an exemplary mobile device 110 or an exemplary on-board computer 114 consistent with the system 100 and the system 180. The mobile device 110 or on-board computer 114 may include a display 202, a GPS unit 206, a communication unit 220, an accelerometer 224, one or more additional sensors (not shown), a user-input device (not shown), and/or, a controller 204. In some embodiments, the mobile device 110 and on-board computer 114 may be integrated into a single device, or either may perform the functions of both. The on-board computer 114 (or mobile device 110) interfaces with the sensors 120 and/or personal electronic devices to receive information regarding the vehicle 108 and its environment, which information is used by the autonomous operation features to operate the vehicle 108.

The controller 204 may include a program memory 208, one or more microcontrollers or microprocessors (MP) 210, a RAM 212, and an I/O circuit 216, all of which are interconnected via an address/data bus 214. The program memory 208 includes an operating system 226, a data storage 228, a plurality of software applications 230, and/or a plurality of software routines 240. The operating system 226, for example, may include one of a plurality of general purpose or mobile platforms, such as the Android™, iOS®, or Windows® systems, developed by Google Inc., Apple Inc., and Microsoft Corporation, respectively. Alternatively, the operating system 226 may be a custom operating system designed for autonomous vehicle operation using the on-board computer 114.

The data storage 228 may include data such as user profiles and preferences, application data for the plurality of applications 230, routine data for the plurality of routines 240, and other data related to the autonomous operation features. In some embodiments, the controller 204 may also include, or otherwise be communicatively connected to, other data storage mechanisms (e.g., one or more hard disk drives, optical storage drives, solid state storage devices, etc.) that reside within the vehicle 108.

It should be appreciated that although FIG. 2 depicts only one microprocessor 210, the controller 204 may include multiple microprocessors 210. Similarly, the memory of the controller 204 may include multiple RAMs 212 and multiple program memories 208. Although FIG. 2 depicts the I/O circuit 216 as a single block, the I/O circuit 216 may include a number of different types of I/O circuits. The controller 204 may implement the RAMs 212 and the program memories 208 as semiconductor memories, magnetically readable memories, or optically readable memories, for example.

The one or more processors 210 may be adapted and configured to execute any of one or more of the plurality of software applications 230 or any one or more of the plurality of software routines 240 residing in the program memory 204, in addition to other software applications. One of the plurality of applications 230 may be an autonomous vehicle operation application 232 that may be implemented as a series of machine-readable instructions for performing the various tasks associated with implementing one or more of the autonomous operation features according to the autonomous vehicle operation method 300, described further below. Another of the plurality of applications 230 may be a battery control application 234 that may be implemented as a series of machine-readable instructions for routing the battery power to the heating system 128 and shutting down power to the remaining electrical components in the EV 108. Still another application of the plurality of applications 230 may include an emergency services application 236 that may be implemented as a series of machine-readable instructions for communicating with the emergency service provider 186 via the network 130.

The plurality of software applications 230 may call various of the plurality of software routines 240 to perform functions relating to autonomous vehicle operation, monitoring, or communication. One of the plurality of software routines 240 may be a power control routine 242 to open the switches to electrical components other than the heating system 128. Another of the plurality of software routines 240 may be a sensor control routine 244 to transmit instructions to a sensor 120 and receive data from the sensor 120. Still another of the plurality of software routines 240 may be an autonomous control routine 246 that performs a type of autonomous control, such as collision avoidance, lane centering, or speed control. In some embodiments, the autonomous vehicle operation application 232 may cause a plurality of autonomous control routines 246 to determine control actions required for autonomous vehicle operation.

Similarly, one of the plurality of software routines 240 may be a monitoring and reporting routine 248 that transmits information regarding autonomous vehicle operation to the server 140 via the network 130. Yet another of the plurality of software routines 240 may be an emergency services communication routine 250 for receiving and transmitting information between the EV 108 and the emergency services provider 186. Any of the plurality of software applications 230 may be designed to operate independently of the software applications 230 or in conjunction with the software applications 230.

When implementing the exemplary autonomous vehicle operation method 300, the controller 204 of the on-board computer 114 may implement the autonomous vehicle operation application 232 to communicate with the sensors 120 to receive information regarding the vehicle 108 and its environment, and process that information for autonomous operation of the vehicle 108.

In addition to connections to the sensors 120 that are external to the mobile device 110 or the on-board computer 114, the mobile device 110 or the on-board computer 114 may include additional sensors 120, such as the GPS unit 206 or the accelerometer 224, which may provide information regarding the EV 108 for operation and other purposes. Such sensors 120 may further include one or more sensors of a sensor array 225, which may include, for example, one or more cameras, accelerometers, gyroscopes, magnetometers, barometers, thermometers, proximity sensors, light sensors, Hall Effect sensors, etc. The one or more sensors of the sensor array 225 may be positioned to determine telematics data regarding the speed, force, heading, and/or direction associated with movements of the EV 108.

Furthermore, the communication unit 220 may communicate with other autonomous vehicles, infrastructure, or other external sources of information to transmit and receive information relating to vehicle operation. The communication unit 220 may communicate with the external sources via the network 130 or via any suitable wireless communication protocol network, such as wireless telephony (e.g., GSM, CDMA, LTE, etc.), Wi-Fi (802.11 standards), WiMAX, Bluetooth, infrared or radio frequency communication, etc. The communication unit 220 may provide input signals to the controller 204 via the I/O circuit 216. The communication unit 220 may also transmit sensor data, device status information, control signals, or other output from the controller 204 to one or more external sensors within the vehicle 108, mobile devices 110, on-board computers 114, or servers 140.

The mobile device 110 or the on-board computer 114 may include a user-input device (not shown) for receiving instructions or information from the vehicle operator, such as settings relating to an autonomous operation feature. The user-input device (not shown) may include a "soft" keyboard that is displayed on the display 202, an external hardware keyboard communicating via a wired or a wireless connection (e.g., a Bluetooth keyboard), an external mouse, a touch pad, a microphone, or any other suitable user-input device. The user-input device (not shown) may also include a microphone capable of receiving user voice input.

Exemplary Autonomous Vehicle Operation Method

Figure 3:
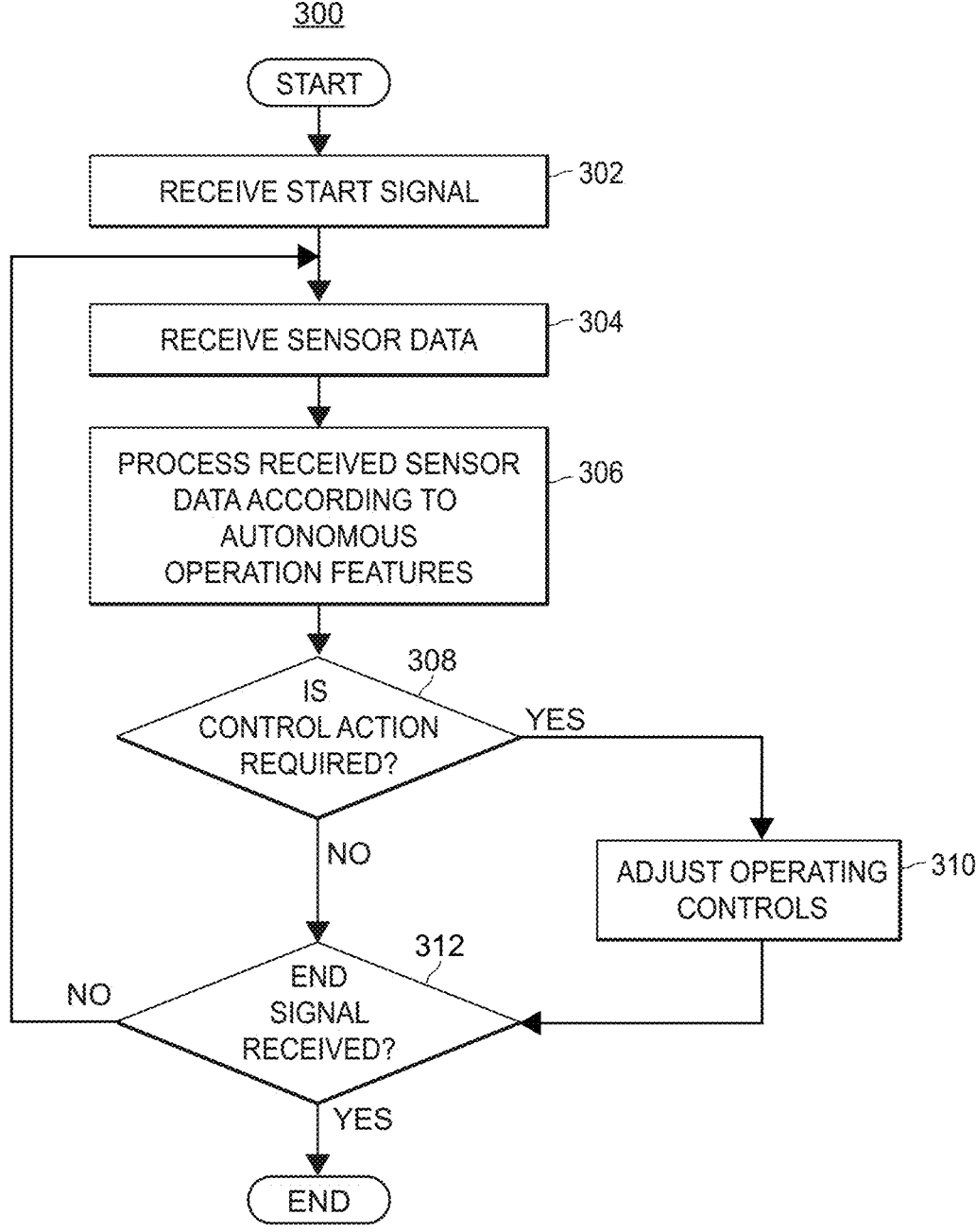
FIG. 3 illustrates a flow diagram of an exemplary autonomous vehicle operation method.

FIG. 3 illustrates a flow diagram of an exemplary autonomous vehicle operation method 300, which may be implemented by the EV data system 100. The computer-implemented method 300 may begin when the controller 204 receives a start signal (block 302). The start signal may be a command from the vehicle operator through the user-input device to enable or engage one or more autonomous operation features of the vehicle 108. In some embodiments, the vehicle operator 108 may further specify settings or configuration details for the autonomous operation features. For fully autonomous vehicles, the settings may relate to one or more destinations, route preferences, fuel efficiency preferences, speed preferences, or other configurable settings relating to the operation of the EV 108.

In some embodiments, fully autonomous vehicles may include additional features or settings permitting them to operate without passengers or vehicle operators within the vehicle. For example, a fully autonomous vehicle may receive an instruction to find a parking space within the general vicinity, which the vehicle may do without the vehicle operator. The vehicle may then be returned to a selected location by a request from the vehicle operator via a mobile device 110 or otherwise. This feature may further be adapted to return a fully autonomous vehicle if lost or stolen.

For other autonomous vehicles, the settings may include enabling or disabling particular autonomous operation features; specifying thresholds for autonomous operation; specifying warnings or other information to be presented to the vehicle operator; specifying autonomous communication types to send or receive; specifying conditions under which to enable or disable autonomous operation features; and/or specifying other constraints on feature operation. For example, a vehicle operator may set the maximum speed for an adaptive cruise control feature with automatic lane centering. In some embodiments, the settings may further include a specification of whether the vehicle 108 should be operating as a fully or partially autonomous vehicle.

In embodiments where only one autonomous operation feature is enabled, the start signal may consist of a request to perform a particular task (e.g., autonomous parking) or to enable a particular feature (e.g., autonomous braking for collision avoidance). In other embodiments, the start signal may be generated automatically by the controller 204 based upon predetermined settings (e.g., when the vehicle 108 exceeds a certain speed or is operating in low-light conditions). In some embodiments, the controller 204 may generate a start signal when communication from an external source is received (e.g., when the vehicle 108 is on a smart highway or near another autonomous vehicle). In some embodiments, the start signal may be generated by or received by the Data Application running on a mobile device 110 or on-board computer 114 within the EV 108. The Data Application may further set or record settings for one or more autonomous operation features of the EV 108.

After receiving the start signal at block 302, the controller 204 receives sensor data from the sensors 120 during vehicle operation (block 304). In some embodiments, the controller 204 may also receive information from external sources through the communication component 122 or the communication unit 220. The sensor data may be stored in the RAM 212 for use by the autonomous vehicle operation application 232. In some embodiments, the sensor data may be recorded in the data storage 228 or transmitted to the server 140 via the network 130.

The Data Application may receive the sensor data, or a portion thereof, and store or transmit the received sensor data. In some embodiments, the Data Application may process or determine summary information from the sensor data before storing or transmitting the summary information. The sensor data may alternately either be received by the controller 204 as raw data measurements from one of the sensors 120 or may be preprocessed by the sensor 120 prior to being received by the controller 204. For example, a tachometer reading may be received as raw data or may be preprocessed to indicate vehicle movement or position. As another example, a sensor 120 comprising a radar or LIDAR unit may include a processor to preprocess the measured signals and send data representing detected objects in 3-dimensional space to the controller 204.

The autonomous vehicle operation application 232 or other applications 230 or routines 240 may cause the controller 204 to process the received sensor data in accordance with the autonomous operation features (block 306). The controller 204 may process the sensor data to determine whether an autonomous control action is required or to determine adjustments to the controls of the vehicle 108 (i.e., control commands). For example, the controller 204 may receive sensor data indicating a decreasing distance to a nearby object in the vehicle's path and process the received sensor data to determine whether to begin braking (and, if so, how abruptly to slow the vehicle 108).

As another example, the controller 204 may process the sensor data to determine whether the vehicle 108 is remaining with its intended path (e.g., within lanes on a roadway). If the vehicle 108 is beginning to drift or slide (e.g., as on ice or water), the controller 204 may determine appropriate adjustments to the controls of the vehicle to maintain the desired bearing. If the vehicle 108 is moving within the desired path, the controller 204 may nonetheless determine whether adjustments are required to continue following the desired route (e.g., following a winding road). Under some conditions, the controller 204 may determine to maintain the controls based upon the sensor data (e.g., when holding a steady speed on a straight road).

In some embodiments, the Data Application may record information related to the processed sensor data, including whether the autonomous operation features have determined one or more control actions to control the vehicle and/or details regarding such control actions. The Data Application may record such information even when no control actions are determined to be necessary or where such control actions are not implemented. Such information may include information regarding the vehicle operating environment determined from the processed sensor data (e.g., construction, other vehicles, pedestrians, anomalous environmental conditions, etc.). The information collected by the Data Application may further include an indication of whether and/or how the control actions are implemented using control components of the vehicle 108.

When the controller 204 determines an autonomous control action is required (block 308), the controller 204 may cause the control components of the vehicle 108 to adjust the operating controls of the vehicle to achieve desired operation (block 310). For example, the controller 204 may send a signal to open or close the throttle of the vehicle 108 to achieve a desired speed. Alternatively, the controller 204 may control the steering of the vehicle 108 to adjust the direction of movement.

In some embodiments, the vehicle 108 may transmit a message or indication of a change in velocity or position using the communication component 122 or the communication module 220, which signal may be used by other autonomous vehicles to adjust their controls. As discussed elsewhere herein, the controller 204 may also log or transmit the autonomous control actions to the server 140 via the network 130 for analysis. In some embodiments, an application (which may be a Data Application) executed by the controller 204 may communicate data to the server 140 via the network 130 or may communicate such data to the mobile device 110 for further processing, storage, transmission to nearby vehicles or infrastructure, and/or communication to the server 140 via network 130.

The controller 204 may continue to receive and process sensor data at blocks 304 and 306 until an end signal is received by the controller 204 (block 312). The end signal may be automatically generated by the controller 204 upon the occurrence of certain criteria (e.g., the destination is reached or environmental conditions require manual operation of the vehicle 108 by the vehicle operator). Alternatively, the vehicle operator may pause, terminate, or disable the autonomous operation feature or features using the user-input device or by manually operating the vehicle's controls, such as by depressing a pedal or turning a steering instrument. When the autonomous operation features are disabled or terminated, the controller 204 may either continue vehicle operation without the autonomous features or may shut off the vehicle 108, depending upon the circumstances.

Where control of the EV 108 must be returned to the vehicle operator, the controller 204 may alert the vehicle operator in advance of returning to manual operation. The alert may include a visual, audio, or other indication to obtain the attention of the vehicle operator. In some embodiments, the controller 204 may further determine whether the vehicle operator is capable of resuming manual operation before terminating autonomous operation. If the vehicle operator is determined not to be capable of resuming operation, the controller 204 may cause the vehicle to stop or take other appropriate action.

To control the EV 108, the autonomous operation features may generate and implement control decisions relating to the control of the motive, steering, and stopping components of the EV 108. The control decisions may include or be related to control commands issued by the autonomous operation features to control such control components of the EV 108 during operation. In some embodiments, control decisions may include decisions determined by the autonomous operation features regarding control commands such feature would have issued under the conditions then occurring, but which control commands were not issued or implemented. For example, an autonomous operation feature may generate and record shadow control decisions it would have implemented if engaged to operate the vehicle 108 even when the feature is disengaged (or engaged using other settings from those that would produce the shadow control decisions).

Exemplary Circuit Diagrams

Figures 4A, 4B:
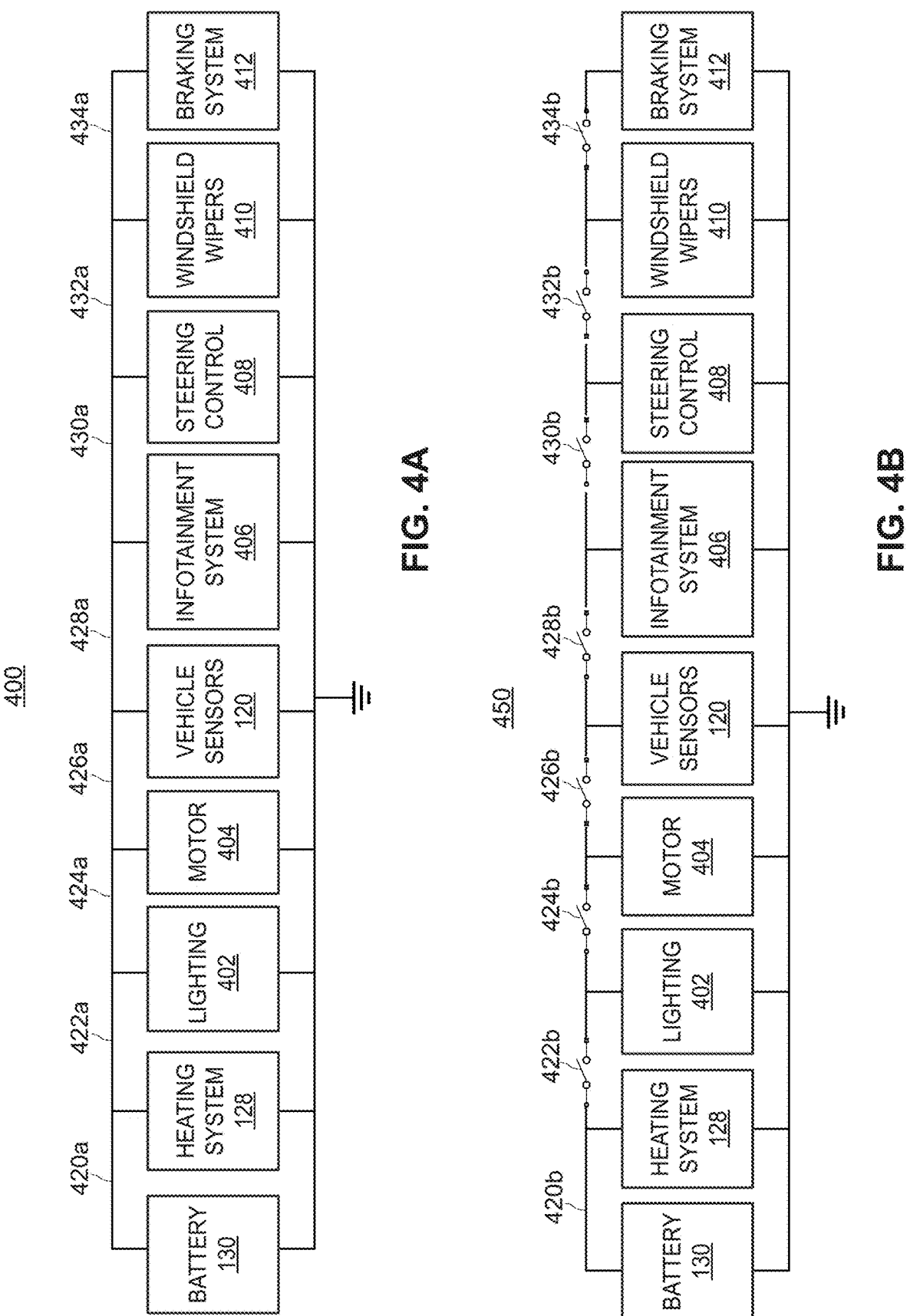
FIGS. 4A-B illustrate circuit diagrams of exemplary electrically powered components within an EV.

As mentioned above, the battery 130 in the EV 108 is electrically coupled to the electrical components within the EV 108, via a wired connection. Additionally, the EV 108 may include switches for turning the power to each of the electrical components on and off, so that the battery 130 can supply power to some electrical components within the EV 108 without supplying power to other electrical components. FIG. 4A illustrates an example circuit diagram 400 depicting the electrical connections between the battery 130 and the electrical components 120, 128, 402-412 within the EV 108. As shown in FIG. 4A, each of the switches 420a-434a for supplying power to the electrical components 120, 128, 402-412 is closed indicating that power is being supplied from the battery 130 to each of them.

By contrast, in the circuit diagram 450 illustrated in FIG. 4B, the switch 420b to supply power to the heating system 128 is closed, but the switches 422b-434b to the other electrical components 120, 402-412 are open indicating that the power is shut down to the other electrical components 120, 402-412 and is being supplied solely to the heating system 128. In this manner, all or most of the remaining charge in the battery 130 may be used to power the heating system 128. This may be particularly important while waiting for emergency services to arrive during extreme weather conditions, such as heavy rain, snow, or very low temperatures. By routing the remaining charge to power the heating system 128, the EV 108 may be able to maintain a certain temperature within the EV 108 while waiting for emergency services to arrive, so that the driver and/or passengers do not suffer from hypothermia or have other health conditions or injuries from the extreme weather conditions.

In some implementations, the on-board computer 114 or the mobile device 110 may be communicatively coupled to the switches 422-434 and may send control signals to open and/or close the switches 422-434 based upon the amount of charge remaining in the battery 130. While FIGS. 4A and 4B illustrate electrical components 120, 128, 402-412, these are merely a few electrical components which may be in the EV 108. Additional or alternative electrical components may also be included and the on-board computer 114 or the mobile device 110 may control the switches for turning on and off the power to the additional or alternative electrical components.

Additionally, while the circuit diagram 450 illustrates each of switches 422b-434b for the electrical components 120, 402-412 other than the heating system 128 as open, the on-board computer 114 or the mobile device 110 may open some of the switches 422b-434b while closing others. For example, in addition to closing the switch to the heating system 128 to supply power to the heating system 128, the on-board computer 114 or the mobile device 110 may close the switch to in-cabin and outdoor temperature sensors 120, so that the heating system can adjust the heating within the EV 108 based upon the in-cabin and/or outdoor temperatures.

Also in some embodiments, the on-board computer 114 may also close a switch to the on-board computer 114 so that the on-board computer 114 can control the heating system 128 and/or transmit and receive notifications from the emergency services provider 186. In other embodiments, once the on-board computer 114 controls the autonomous operation features in the EV 108 to cause the EV 108 to travel to a safe location, such as the side of the road, determines a desired temperature or threshold temperature level for the EV 108, and/or transmits a notification to the emergency services provider 186 and receives a response message indicating that the emergency services is on the way to the location of the EV 108, the on-board computer 114 may open the switch to the on-board computer 114 for further power savings.

Exemplary Emergency Heating Method

Figure 5:
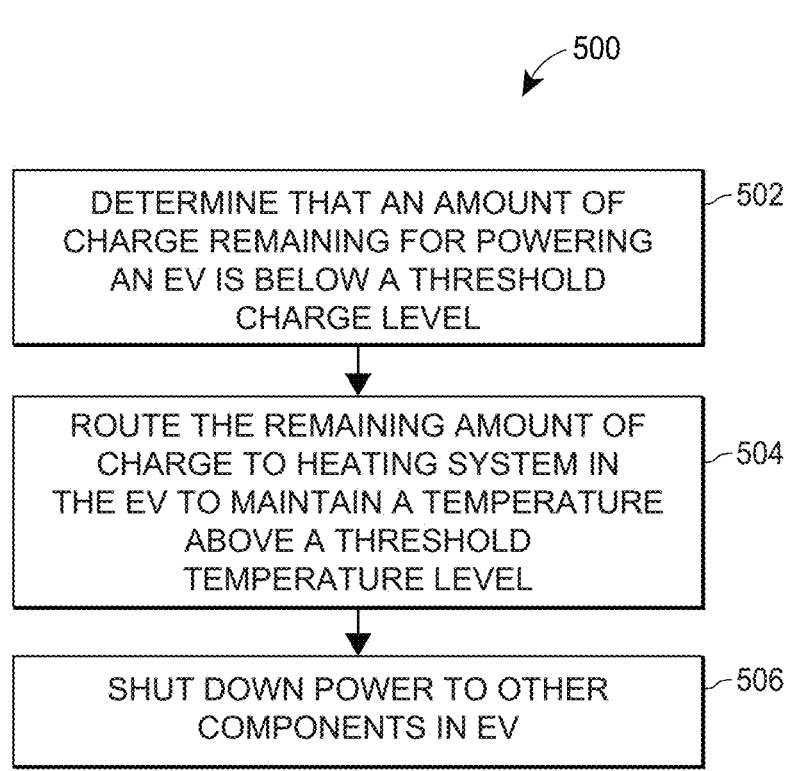
FIG. 5 illustrates a flow diagram of an exemplary EV method for providing emergency heating in an EV running out of power.

FIG. 5 illustrates a flow diagram of an exemplary EV method 500 for providing emergency heating in an EV 108 running out of power. In some embodiments, the EV communication method 500 may be implemented on the on-board computer 114 or mobile device 110 in the EV 108. The EV 108 may be operating in a fully autonomous mode of operation without any control decisions being made by a vehicle operator, excluding navigation decisions such as selection of a destination or route.

In some embodiments, the EV 108 may be operating with only passengers who are physically or legally unable to operate the vehicle 108 in a manual or semi-autonomous mode of operation (e.g., children, persons suffering acute illness, intoxicated or otherwise impaired persons, etc.). In other embodiments, the EV 108 may be operated manually by a driver or may be operating in a semi-autonomous mode with some control decisions being made by a vehicle operators and others being made autonomously, such as adaptive cruise control.

The EV method 500 may include determining that an amount of charge remaining for powering the EV 108 is below a threshold charge level (block 502). Then the on-board computer 114 may route the remaining amount of charge in the battery 130 to the heating system 128 to maintain a temperature above a threshold temperature level (block 504). The on-board computer 114 may also shut down power to the other electrical components in the EV 108 (block 506). Although the method 500 is described with reference to the on-board computer 114 for simplicity, the described method may be easily modified for implementation by other systems or devices, including the mobile device 110.

At block 502, the on-board computer 114 may determine that the amount of charge remaining for powering the EV 108 is below a threshold charge level. For example, the threshold charge level may be a threshold battery percentage for the battery 130, such as 10%. In another example, the threshold charge level may be a threshold energy metric, such as a threshold number of milliamp hours (mAH) remaining in the battery 130. The on-board computer 114 may receive an indication of the amount of charge remaining for example, from a charge level sensor in the battery 130. The indication may be a battery percentage or an energy metric. The on-board computer 114 may receive continuous or periodic (e.g., every second, every minute, etc.) updates from the charge level sensor indicating the current amount of charge remaining in the battery 130.

In some embodiments, the threshold charge level may be a predetermined threshold charge level (e.g., 10% battery power remaining). In other embodiments, the on-board computer 114 may determine the threshold charge level based upon a distance to the nearest charging and/or fueling station. For example, the on-board computer 114 may include a mapping application and/or may communicate with a mapping service via the network 130.

The on-board computer 114 may continuously or periodically obtain indications of locations of charging and/or fueling stations from the mapping application/mapping service and may determine the distance from the location of the EV 108 to the nearest charging and/or fueling station. In other embodiments, the threshold charge level may be a first threshold charge level, and the on-board computer 114 may obtain indications of locations of charging and/or fueling stations when the amount of charge remaining is below a second charge level which may be higher than the first charge level (e.g., 30% battery power remaining).

In any event, the on-board computer 114 may determine the threshold charge level (e.g., the first threshold charge level) based upon the distance to the nearest charging and/or fueling station. For instance, the threshold charge level necessary to reach the nearest charging and/or fueling station may be proportional to the distance to the nearest charging and/or fueling station. For example, when the nearest charging and/or fueling station is two miles away, the threshold charge level may be 2% battery power remaining, but when the nearest charging and/or fueling station is five miles away, the threshold charge level may be 5% battery power remaining.

In some embodiments, the on-board computer 114 may determine the threshold charge level based upon a shutdown risk level for the EV 108. The shutdown risk level may be a score for example, on a scale of 1-100 based upon the distance to the nearest charging and/or fueling station and/or the amount of charge remaining. As the shutdown risk level increases, the threshold charge level may decrease.

In some embodiments, such as when the EV 108 is operating in a fully autonomous mode of operation, the on-board computer 114 may cause the EV 108 to travel to a safe location in response to determining that the amount of charge remaining for powering the EV 108 is below the threshold charge level, such as pulling over to the side of the road. For example, as described above, the on-board computer 114 may directly or indirectly control the operation of the EV 108 according to various autonomous operation features. The autonomous operation features may include software applications or modules implemented by the on-board computer 114 to generate and implement control commands to control the steering, braking, or throttle of the EV 108. When a control command is generated by the on-board computer 114, it may thus be communicated to the control components of the EV 108 to effect a control action. The on-board computer 114 may generate control commands to brake, accelerate, steer into another lane, turn onto another road, etc. to travel to the safe location, such as the side of the road.

Also in response to determining that the amount of charge remaining for powering the EV 108 is below the threshold charge level, the on-board computer 114 may automatically transmit a notification to the emergency services provider 186 requesting emergency services, such as towing services or a temporary charge, and/or indicating the location of the EV 108. The emergency services provider 186 may be a provider of a tow truck, a vehicle or other device for providing temporary charge to the EV 108 so that the EV 108 has enough charge to reach the nearest charging station, or any other suitable vehicle or device for assisting the EV 108 when the EV 108 is unable to travel to the nearest charging and/or fueling station.

In other implementations, the on-board computer 114 may include user controls for a user, such as a driver or passenger to transmit the notification to the emergency service provider 186 requesting emergency services when the user determines that the amount of charge remaining in the EV 108 is too low to reach the nearest charging and/or fueling station.

The emergency services provider 186 may respond to the notification with a response message to the EV 108 indicating that emergency services have been dispatched to the location of the EV 108 and/or indicating an expected time for the emergency service to arrive at the location.

At block 504, the on-board computer 114 may route the remaining amount of charge in the battery 130 to the heating system 128 to maintain a temperature above a threshold temperature level (block 504). For example, the on-board computer 114 may send control signals to open the switches to other electrical components in the EV 108 so that the remaining amount of charge is used to heat the EV 108 until emergency services arrives at the EV's 108 location (block 506). In some embodiments, the on-board computer 114 may keep switches to some of the other electrical components closed to power certain electrical components associated with the heating system 128, such as the on-board computer 114 and/or temperature sensors 120.

In some embodiments, the on-board computer 114 may determine the outdoor temperature outside of the EV 108, for example from the outdoor temperature sensor 120. The on-board computer 114 may determine the threshold temperature level based upon the outdoor temperature.

In some embodiments, the threshold temperature level may be inversely proportional to the outdoor temperature. For example, if the outdoor temperature is 30 degrees Fahrenheit, the threshold temperature level may be 50 degrees. On the other hand, if the outdoor temperature is 0 degrees, the threshold temperature level may be 60 degrees to keep the driver and/or passengers warmer relative to the outdoor temperature. In other embodiments, the threshold temperature level may be a fixed threshold temperature level regardless of the outdoor temperature (e.g., 55 degrees).

Additionally, the threshold temperature level may be a first threshold temperature level, and the on-board computer 114 may compare the outdoor temperature to a second threshold temperature level, which may be the same as or different from the first threshold temperature level. The on-board computer 114 may then route the remaining amount of charge in the battery 130 to the heating system 128 in response to determining that the outdoor temperature is below the second threshold temperature level. In this manner, the on-board computer 114 may activate the emergency heating system when there are extreme weather conditions outside of the vehicle, such that it is unsafe for the driver and/or passengers to be in the vehicle without sufficient heating. If the outdoor temperature is not below the second threshold temperature level, the on-board computer 114 may determine that it is not necessary to route the remaining amount of charge in the battery to the heating system 128 and may continue normal operation.

Also in some embodiments, the on-board computer 114 may determine a duration until the emergency services are expected to arrive based upon the notification from the emergency services provider 186. The on-board computer 114 may then estimate and/or predict a maximum temperature that the heating system 128 can maintain for that duration based upon the amount of charge remaining in the battery 130. The maximum temperature may also be based upon the outdoor temperature. For example, the heating system 128 may require more power to heat the EV 108 to an in-cabin temperature which is 20 degrees higher than the outdoor temperature than to heat the EV 108 to an in-cabin temperature which is 10 degrees higher than the outdoor temperature.

The on-board computer 114 may estimate and/or predict a maximum temperature that the heating system 128 can maintain for that duration using historical data from the heating system in the EV 108 and/or other EVs. For example, the on-board computer 114 may obtain a machine learning model trained based upon historical data including remaining charge levels, in-cabin temperatures, and/or the durations in which the in-cabin temperatures were maintained before losing power. The on-board computer 114 may then apply the duration and remaining charge level for the battery 130 to the machine learning model to estimate and/or predict the maximum temperature. In other embodiments, the on-board computer 114 may store a table or set of rules indicating for different durations and/or remaining charge levels, the maximum temperature that the heating system 128 can maintain.

The on-board computer 114 may then compare the maximum temperature to the threshold temperature level (e.g., the first threshold temperature level). If the maximum temperature (e.g., 55 degrees) is at least within a threshold range (e.g., 5 degrees) of the threshold temperature level (e.g., 60 degrees), the on-board computer 114 may automatically set the in-cabin temperature to the maximum temperature, and the heating system 128 may control the temperature in the EV 108 to maintain the maximum temperature.

On the other hand, if the maximum temperature (e.g., 55 degrees) is outside of the threshold range (e.g., 5 degrees) of the threshold temperature level (e.g., 60 degrees), the on-board computer 114 may determine a maximum duration in which the heating system 128 can maintain the threshold temperature level using the remaining amount of charge. For example, the on-board computer 114 may determine the maximum duration using a machine learning model or set of rules in a similar manner as described above. Then the on-board computer 114 may transmit a notification to the emergency services provider 186 indicating the maximum duration and requesting the emergency services provider 186 to arrive by the expiration of the maximum duration.

Machine Learning

Machine learning techniques have been developed that allow parametric or nonparametric statistical analysis of large quantities of data. Such machine learning techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points. In some embodiments, the methods and systems described herein may use machine learning techniques to identify and estimate the effects of observed or latent variables such as time of day, weather conditions, traffic congestion, interaction between vehicle operation features, or other such variables that influence the risks associated with vehicle operation.

Some embodiments described herein may include automated machine learning to determine the maximum temperature that the heating system can maintain for a particular duration for a particular amount of charge remaining in the battery, determine the maximum duration that the heating system can maintain a particular temperature for a particular amount of charge remaining in the battery, determine risk levels, identify relevant risk factors, optimize autonomous or semi-autonomous operation, optimize routes, determine autonomous operation feature effectiveness, predict user demand for a vehicle, determine vehicle operator or passenger illness or injury, evaluate sensor operating status, predict sensor failure, evaluate damage to a vehicle, predict repairs to a vehicle, predict risks associated with manual vehicle operation based upon the driver and environmental conditions, recommend optimal or preferred autonomous operation feature usage, estimate risk reduction or cost savings from feature usage changes, determine when autonomous operation features should be engaged or disengaged, determine whether a driver is prepared to resume control of some or all vehicle operations, and/or determine other events, conditions, risks, or actions as described elsewhere herein.

Although the methods described elsewhere herein may not directly mention machine learning techniques, such methods may be read to include such machine learning for any determination or processing of data that may be accomplished using such techniques. In some embodiments, such machine-learning techniques may be implemented automatically upon occurrence of certain events or upon certain conditions being met. Use of machine learning techniques, as described herein, may begin with training a machine learning program, or such techniques may begin with a previously trained machine learning program.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data (such as autonomous vehicle system, feature, or sensor data, autonomous vehicle system control signal data, vehicle-mounted sensor data, mobile device sensor data, and/or telematics, image, or radar data) in order to facilitate making predictions for subsequent data (again, such as autonomous vehicle system, feature, or sensor data, autonomous vehicle system control signal data, vehicle-mounted sensor data, mobile device sensor data, and/or telematics, image, or radar data). Models may be created based upon example inputs of data in order to make valid and reliable predictions for novel inputs.

Additionally or alternatively, the machine learning programs may be trained by inputting sample data sets or certain data into the programs, such as autonomous system sensor and/or control signal data, and other data discuss herein. The machine learning programs may utilize deep learning algorithms primarily focused on pattern recognition, and may be trained after processing multiple examples. The machine learning programs may include Bayesian program learning (BPL), voice recognition and synthesis, image or object recognition, optical character recognition, and/or natural language processing-either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. In unsupervised machine learning, the processing element may be required to find its own structure in unlabeled example inputs. In one embodiment, machine learning techniques may be used to extract the control signals generated by the autonomous systems or sensors, and under what conditions those control signals were generated by the autonomous systems or sensors.

The machine learning programs may be trained with autonomous system data, autonomous sensor data, and/or vehicle-mounted or mobile device sensor data to identify actions taken by the autonomous vehicle before, during, and/or after vehicle collisions; identify who was behind the wheel of the vehicle (whether actively driving, or riding along as the autonomous vehicle autonomously drove); identify actions taken by the human driver and/or autonomous system, and under what (road, traffic, congestion, or weather) conditions those actions were directed by the autonomous vehicle or the human driver; identify damage (or the extent of damage) to insurable vehicles after an insurance-related event or vehicle collision; and/or generate proposed insurance claims for insured parties after an insurance-related event.

The machine learning programs may be trained with autonomous system data, autonomous vehicle sensor data, and/or vehicle-mounted or mobile device sensor data to identify preferred (or recommended) and actual control signals relating to or associated with, for example, whether to apply the brakes; how quickly to apply the brakes; an amount of force or pressure to apply the brakes; how much to increase or decrease speed; how quickly to increase or decrease speed; how quickly to accelerate or decelerate; how quickly to change lanes or exit; the speed to take while traversing an exit or entrance ramp; at what speed to approach a stop sign or light; how quickly to come to a complete stop; and/or how quickly to accelerate from a complete stop.

After training, machine learning programs (or information generated by such machine learning programs) may be used to evaluate additional data. Such data may be related to tests of new autonomous operation feature or versions thereof, actual operation of an autonomous vehicle, or other similar data to be analyzed or processed. The trained machine learning programs (or programs utilizing models, parameters, or other data produced through the training process) may then be used for determining, assessing, analyzing, predicting, estimating, evaluating, or otherwise processing new data not included in the training data. Such trained machine learning programs may, thus, be used to perform part or all of the analytical functions of the methods described elsewhere herein.

Other Matters

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules. Moreover, the systems and methods described herein are directed to an improvement to computer functionality and improve the functioning of conventional computers.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method for providing emergency heating in an electric vehicle (EV) running out of power, the method comprising:

determining, by one or more processors in an EV, an amount of charge remaining for powering the EV;

routing, by the one or more processors, at least some of the remaining amount of charge to power a heating system in the EV; and shutting down, by the one or more processors, power to at least one other component within the EV.

2. The computer-implemented method of claim 1, further comprising:

determining, by the one or more processors, a temperature outside of the EV; and routing, by the one or more processors, at least some of the remaining amount of charge to power the heating system in response to determining that the outside temperature is below a threshold temperature level.

3. The computer-implemented method of claim 1, wherein the EV has one or more autonomous operation features.

4. The computer-implemented method of claim 3, further comprising:

in response to determining that the amount of charge remaining for powering the EV is below a threshold charge level, sending, by the one or more processors, control signals to the EV to cause the EV to pull over to a side of a road.

5. The computer-implemented method of claim 1, further comprising:

determining, by the one or more processors, a duration until emergency services are expected to arrive;

predicting, by the one or more processors, a maximum temperature that the heating system can maintain in the EV using the remaining amount of charge for the determined duration; and in response to determining that the maximum temperature is within a threshold range of a threshold temperature level, setting, by the one or more processors, the temperature in the vehicle to the maximum temperature.

6. The computer-implemented method of claim 5, further comprising:

in response to determining that the maximum temperature is not within the threshold range of the threshold temperature level:

determining, by the one or more processors, a maximum duration that in which the heating system can maintain the threshold temperature level using the remaining amount of charge; and transmitting, by the one or more processors, a notification to the emergency services indicating the maximum duration.

7. The computer-implemented method of claim 5, wherein the threshold temperature level is based upon a temperature outside of the EV.

8. The computer-implemented method of claim 7, wherein the threshold temperature level is inversely proportional to the outside temperature.

9. A computer system configured to provide emergency heating in an electric vehicle (EV) running out of power, the computer system comprising one or more local or remote processors, transceivers, and/or sensors configured to:

determine an amount of charge remaining for powering an EV;

route at least some of the remaining amount of charge to power a heating system in the EV; and shut down power to at least one other component within the EV.

10. The computer system of claim 9, wherein the computer system is further configured to:

determine a temperature outside of the EV; and route at least some of the remaining amount of charge to power the heating system in response to determining that the outside temperature is below a threshold temperature level.

11. The computer system of claim 9, wherein the EV has one or more autonomous operation features.

12. The computer system of claim 11, wherein the computer system is further configured to:

in response to determining that the amount of charge remaining for powering the EV is below a threshold charge level, send control signals to the EV to cause the EV to pull over to a side of a road.

13. The computer system of claim 9, wherein the computer system is further configured to:

determine a duration until emergency services are expected to arrive;

predict a maximum temperature that the heating system can maintain in the EV using the remaining amount of charge for the determined duration; and in response to determining that the maximum temperature is within a threshold range of a threshold temperature level, set the temperature in the vehicle to the maximum temperature.

14. The computer system of claim 13, wherein the computer system is further configured to:

in response to determining that the maximum temperature is not within the threshold range of the threshold temperature level:

determine a maximum duration that in which the heating system can maintain the threshold temperature level using the remaining amount of charge; and transmit a notification to the emergency services indicating the maximum duration.

15. The computer system of claim 13, wherein the threshold temperature level is based upon a temperature outside of the EV.

16. The computer system of claim 15, wherein the threshold temperature level is inversely proportional to the outside temperature.

17. A non-transitory computer-readable medium storing instructions thereon that, when executed by one or more processors in an electric vehicle (EV), cause the one or more processors to:

determine an amount of charge remaining for powering an EV;

route at least some of the remaining amount of charge to power a heating system in the EV; and shut down power to at least one other component within the EV.

18. The non-transitory computer-readable medium of claim 17, wherein the instructions further cause the one or more processors to:

determine a temperature outside of the EV; and route at least some of the remaining amount of charge to power the heating system in response to determining that the outside temperature is below a threshold temperature level.

19. The non-transitory computer-readable medium of claim 17, wherein the EV has one or more autonomous operation features.

20. The non-transitory computer-readable medium of claim 19, wherein the instructions further cause the one or more processors to:

in response to determining that the amount of charge remaining for powering the EV is below a threshold charge level, send control signals to the EV to cause the EV to pull over to a side of a road.

* * * * *